April 1, 1958 L. L. DAWKINS 2,829,208

HIGH FREQUENCY TAPE RECORDER

Filed Oct. 20, 1955 2 Sheets-Sheet 1

INVENTOR

Lacy L. Dawkins

BY

Pierce, Scheffler & Parker

ATTORNEYS

April 1, 1958 L. L. DAWKINS 2,829,208

HIGH FREQUENCY TAPE RECORDER

Filed Oct. 20, 1955 2 Sheets-Sheet 2

INVENTOR
Lacy L. Dawkins

BY Pierce, Scheffler & Parker

ATTORNEYS

United States Patent Office 2,829,208

Patented Apr. 1, 1958

2,829,208

HIGH FREQUENCY TAPE RECORDER

Lacy L. Dawkins, Cary, N. C.

Application October 20, 1955, Serial No. 541,588

6 Claims. (Cl. 179—100.2)

This invention pertains to magnetic tape recording apparatus generally, and more specifically to apparatus for recording a large amount of information on magnetic tape at high relative speed between the recording head and the recording medium.

It is well known in the magnetic recording art that there are certain limitations to the use and fidelity of reproduction of the recordings. For example, the top frequency that can be reproduced is, among other things, a function of the relative speed between the record and the reproducing head. The fidelity of reproduction may be greatly improved by increasing the relative speed of the recording head with respect to the record. The U. S. patent to Berens #2,661,397 discloses a magnetic recording apparatus wherein the recording head and the reproducing head are mounted for movement in a direction opposite to the direction of movement of the magnetic tape, to thereby produce a relative movement between the recording head or reproducing head and the tape to obtain a higher relative speed during recording. Rotating recording heads are similarly shown by the patents to Cooley #2,690,473 and Gunby #2,611,828. My invention consists of an improved method of magnetic tape recording wherein the relative speed of the magnetic material with respect to the recording head is increased.

Thus an object of my invention is to provide an improved magnetic tape recording apparatus which will obtain high relative speed between the recording head and the magnetic tape record with slow longitudinal movement of the tape.

Another object of my invention is to provide an improved magnetic tape recording apparatus which will obtain high relative speed between the recording head and the magnetic tape record for a long-playing record of standard length with slow longitudinal movement of the tape.

Another object of my invention is to provide a magnetic tape recording apparatus which will spirally record a sound and/or video or other information track on a continuously moving magnetic tape.

A further object of my invention is to continuously record a spiral sound and/or video or other information track across a magnetic tape when the tape is temporarily formed into a tubular shape as it travels longitudinally through the recorder.

A still further object of my invention is to provide a magnetic tape with serrated edges in combination with a tape feeding mechanism which will temporarily form the tape into a tubular configuration with the serrated tape edges intermeshing to provide alignment of the edges and to prevent slippage.

With the above and other objects in view, the invention will be hereinafter more particularly described, and the combination and arrangement of parts will be shown in the accompanying drawings and pointed out in the claims which form a part of this specification.

Reference will now be had to the drawings, in which.

Figures 1, 2:
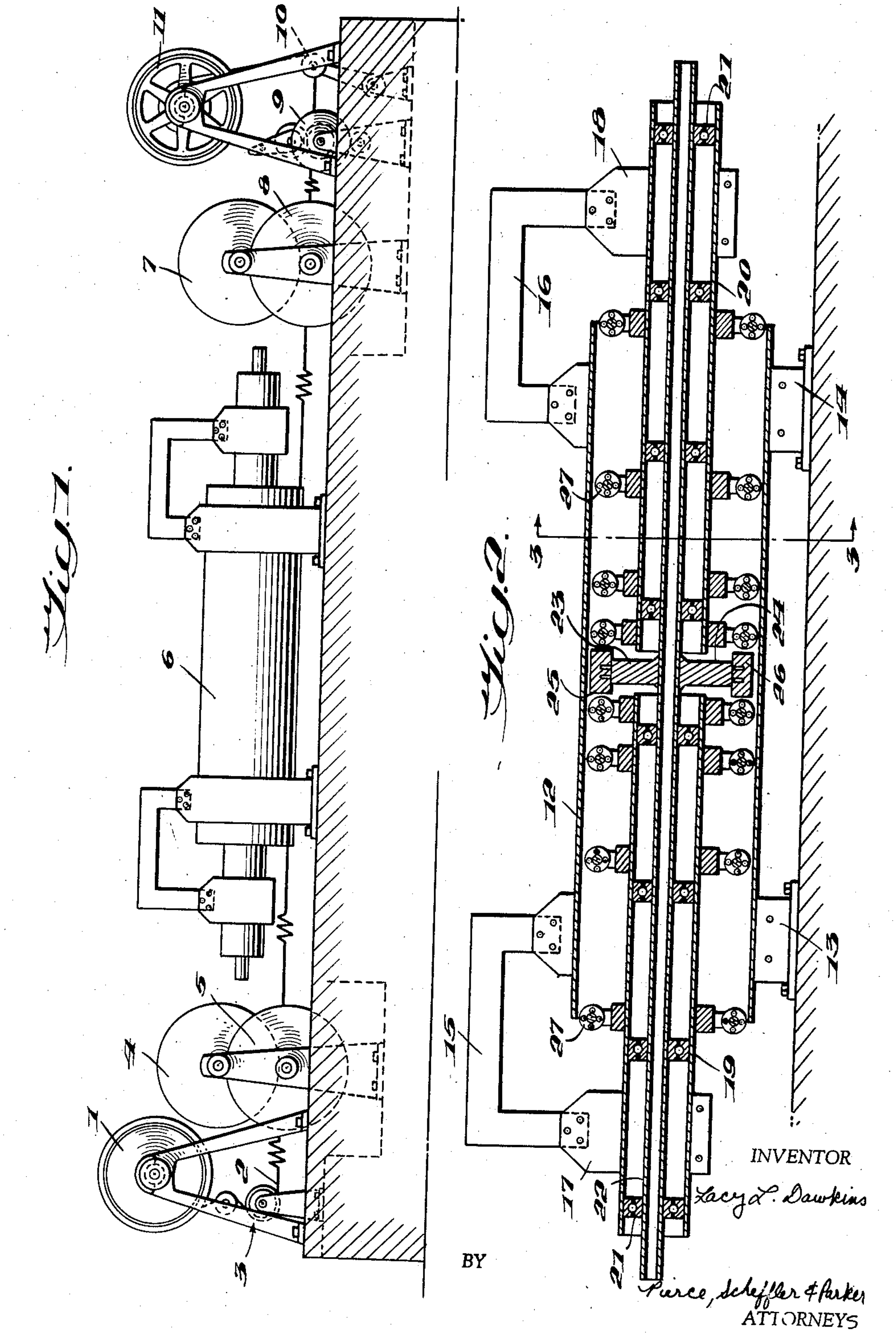
Figure 1 is a side elevational view of the magnetic tape recording apparatus including the feeding and take-up apparatus.
Figure 2 is a longitudinal cross-section of the recorder.

Referring to Figure 1, the flat magnetic tape is wound upon the tape supply reel 1. During the recording process, the magnetic tape 2 is continuously unwound from the supply reel and passes through the supply reel take-up tension mechanism shown generally at 3, where the desired tension is applied to the moving tape. The tape is then fed to the tape shaping rollers 4 and 5 where, as will be later described, the tape is begun to be shaped into a tubular configuration, the edges of the tape being gradually brought together to form a tube. The tape in approximately tubular form enters the recorder 6. A revolving recorder records a spiral track across the inner surface of the longitudinally-moving tubularly-formed tape. The tape leaves the recorder in the tubular form, passes through the tape shaping rollers 7 and 8, and is returned to its normal flat configuration. The tape then passes through the horizontal capstan 9, which provides traction for motivating the tape through the apparatus, through the take-up tension mechanism 10, and thence to the take-up or storage reel 11. The supply reel 1 may be provided with a rewind motor whereby during the rewinding process, the tape passes from the take-up reel to the supply reel in the reverse direction through the recording apparatus.

Referring now to Figure 2, the recorder consists of a stationary cylinder 12, rigidly supported by supporting brackets 13 and 14. Secured to the brackets 13 and 14 are arms 15 and 16 which support brackets 17 and 18. Mounted in brackets 17 and 18 are stationary inner cylinders 19 and 20. Rotatably mounted in bearings 21 secured to the inside surfaces of inner cylinders 19 and 20 is recording shaft 22. Rigidly secured to the rotary recording shaft are mounting arms 23 and 24 which carry the recording head 25 and the monitoring pick-up head 26. The monitoring pick-up head follows the recording head by 180 degrees on the rotating shaft and acts as a balance against the weight of the recording head, allowing more uniform spacing between recording head and tape. The monitoring head allows the operator to make a check on the recording one-half revolution behind the actual recording. A micrometer screw adjusting mechanism, not shown, provides means for minutely adjusting the position of the recording and monitoring heads with respect to the linear dimension of the tape, enabling the exact placement of the monitor on the pick-up track when operated for playback. The monitor head is offset half the width of a recorded track so that it follows exactly in the path of the recording head instead of a half track behind.

Figure 3:
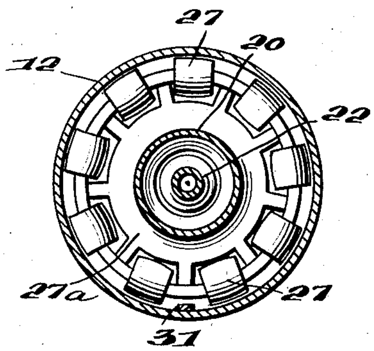
Figure 3 is a cross-section view of the recorder taken at 3—3.

Tape guide rollers 27 are secured to the stationary inner cylinders 19 and 20 by means of supporting members *27a*. A small clearance is provided between the inner surface of stationary cylinder 12 and the rollers 27. Thus the tape in tubular form continuously passes through the recorder between the rollers 27 and the inner surface of the cylinder 12. Since the recording head 25 is continuously rotated on the inner surface of the longitudinally moving temporarily formed tubular magnetic tape, a spiral track will be made across the tape. Thus for relatively slow longitudinal movement of the tape, the recording head may rotate rapidly across the inner surface of the temporarily-formed tubular tape to provide the desired higher relative speed between the recording head and the tape. Figure 3 shows the clearance between rollers 27 and the inner surface of cylinder 12, allowing passage for the tubularly-formed tape 2.

Figure 4:
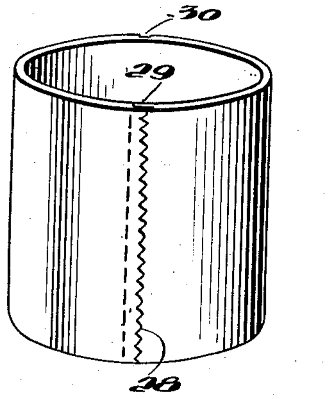
Figure 4 is a perspective view of a section of tape shaped into tubular form.

Referring to Figure 4, the tape may be provided with serrated edges 28 with a flanged flap 29. The tape may be provided with a slot 30 to cooperate with the tape guide 31 (Figure 3). Thus the combination of the serrated edges, and the tape guide and slot means, functions to orient the tape in the recorder, prevent slippage, and to aid in forming the tubular configuration. The flap 29 functions to provide a smooth inside surface to the recording head.

Figure 5:
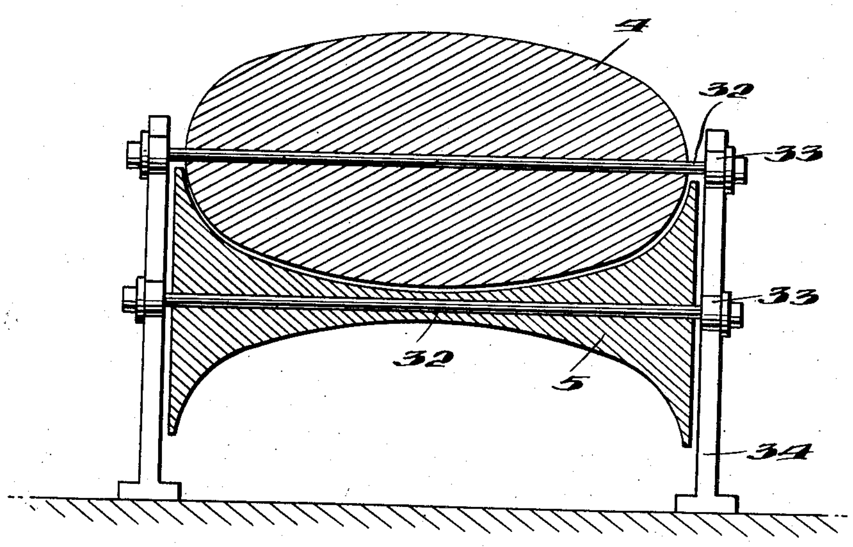
Figure 5 is a cross-section of the tape shaper rollers.

As seen in Figure 5, the tape shaper roller 4 has an elliptical cross section, while the corresponding shaper roller 5 has a cross-section wide at the extremities and tapering to a narrow portion at the middle, so that tape passing between the rollers will be formed into a half-cylinder with approximately U-shaped cross section. The roller shafts 32 are mounted in bearings 33 in supports 34. It is the passage through the tape shaper rollers that begins the forming of the tubular configuration.

Thus in operation, the flat tape is slowly fed from the supply reel, through the tape tensioning device, to the tape shaping rollers where the forming of the tape into the tubular configuration is commenced, the side edges being curled up gradually until the serrated edges meet and cooperate to form a tube as the tape passes through the center of the recorder. There the recording head revolving at a high rate of speed records a spiral track inside the tube of tape. The tube then passes through the second set of tape shaper rollers where it emerges as a flat strip again, through the capstan and take-up tension mechanism, and finally to the storage take-up reel.

The magnetic tape could be of any convenient width and length. If the tape were made 25 inches wide then each revolution of the recording head would expose 25 inches of magnetic track. If the heads were revolved four times per second, for instance, then 100 inches of magnetic tape would be exposed per second. The lateral motion of tape feed could be adjusted through the recorder as desired. The horizontal capstan which provides tape traction can be driven by a synchronous motor which is synchronized with the motor driving the rotating recording head mechanism. Thus by proper adjusting means, the rate of rotation of the recording head and longitudinal movement of the tape may be controlled.

Various means may be provided for electrically wiring the rotating recording and monitoring heads. Electrical tap-offs may be made from slip-rings on the recorder shaft, or pick-offs may be made by air dielectric capacitors, the stators of which are electrostatically coupled to rotors mounted on the revolving shaft.

The frequency range of the system utilizing a revolving recording head on the inside of a tubular section of magnetic tape is on the order of 30,000,000 cycles per second, or possibly well up in the V. H. F. range. Since television video signal frequencies are presently confined to a maximum value of 4,000,000 cycles per second, the forward movement of tape feed could be held to a value which would permit hours of TV program recording or play-back on a single reel of tape. Thus it may be seen that my device is particularly applicable where there is a need for a long-playing record.

While in accordance with the provisions of the statutes, I have illustrated and described the best form of embodiment of my invention now known to me, it will be apparent to those skilled in the art that changes may be made in the form of the apparatus described without departing from the spirit of my invention as set forth in the appended claims.

What I claim is:

1. Magnetic tape recording and playback apparatus comprising a supply reel, flat magnetic tape wound upon said reel, means for unwinding said tape from said supply reel and effecting movement of the tape longitudinally of itself, means for bringing the oppositely located edges of a portion of said longitudinally moving tape together to form a tubular portion thereof, a recording chamber, recording and reproducing means rotatably mounted within said chamber, means for guiding said tubular portion of said tape through said recording chamber about said recording and reproducing means, means for rotating said recording and reproducing means within said longitudinally moving tubular portion to record and monitor a spiral track on the inner circumference thereof, means for returning said tubular portion of tape to its normal flat configuration, and a take-up reel upon which said tape is wound.

2. Magnetic tape recording and playback apparatus as defined in claim 1, wherein said tape has serrated edges which cooperate when the edges are brought together to form the tubular portion, whereby a relatively firm tubular structure is obtained.

3. Magnetic tape recording and playback apparatus as defined in claim 1 wherein said recording chamber comprises an outer cylinder, two inner cylinders of diameters smaller than that of the outer cylinder, said inner cylinders being supported end to end within said outer cylinder with the axes of said inner cylinders coincident with the axis of said outer cylinder, the adjacent ends of said cylinders being spaced a distance apart, and wherein said tape guide means comprises a plurality of guide rollers supported along the outer surfaces of said inner cylinders to provide a uniform circular passage for the tubular tape portion between the inner circumference of the outer cylinder and the guide rollers.

4. Magnetic tape recording and playback apparatus as defined in claim 3 wherein said recording and reproducing means comprise a shaft, said shaft extending through said inner cylinders and rotatably mounted on the axes thereof in bearing means secured therein, a recording head mounting arm and a reproducing head mounting arm diametrically secured to said shaft and extending through said space between said inner cylinders, a recording head secured to said recording head mounting arm and a reproducing head mounting arm secured to said reproducing head mounting arm, said recording head and said reproducing head being mounted a suitable distance from the inner surface of said tubular tape portion, whereby rotation of said shaft within said recording chamber will provide movement of the recording and reproducing heads transverse to the longitudinally moving tubular tape portion to obtain higher relative motion between said heads and said tape.

5. Magnetic tape recording and playback apparatus as defined in claim 4 wherein said monitoring head is off-set one-half a width of track from the recording head.

6. Magnetic tape recording and playback apparatus as defined in claim 1 wherein said means for bringing said tape edges together to form a tubular portion and said means for returning said tubular portion to a flat configuration comprise a first shaping roller with an elliptical cross-section, a second shaping roller cooperating with said first roller, said second roller having a cross-section wide at the extremities and tapering to a narrow portion at its middle, shafts extending through said rollers along their longitudinal axes, said shafts being rotatably mounted in bearings in supporting members and in parallel relation with one of said shafts vertically mounted with respect to the other, whereby flat tape fed to said shaping rollers emerges as a half-cylinder with a U-shaped cross section.

References Cited in the file of this patent

UNITED STATES PATENTS

| | | |
|---|---|---|
| 2,245,286 | Marzocchi | June 10, 1941 |
| 2,643,130 | Kornei | June 23, 1953 |
| 2,677,727 | Haynes | May 4, 1954 |
| 2,688,663 | Munroe | Sept. 7, 1954 |
| 2,711,901 | Von Behren | June 28, 1955 |
| 2,773,120 | Masterson | Dec. 4, 1956 |